UNITED STATES PATENT OFFICE.

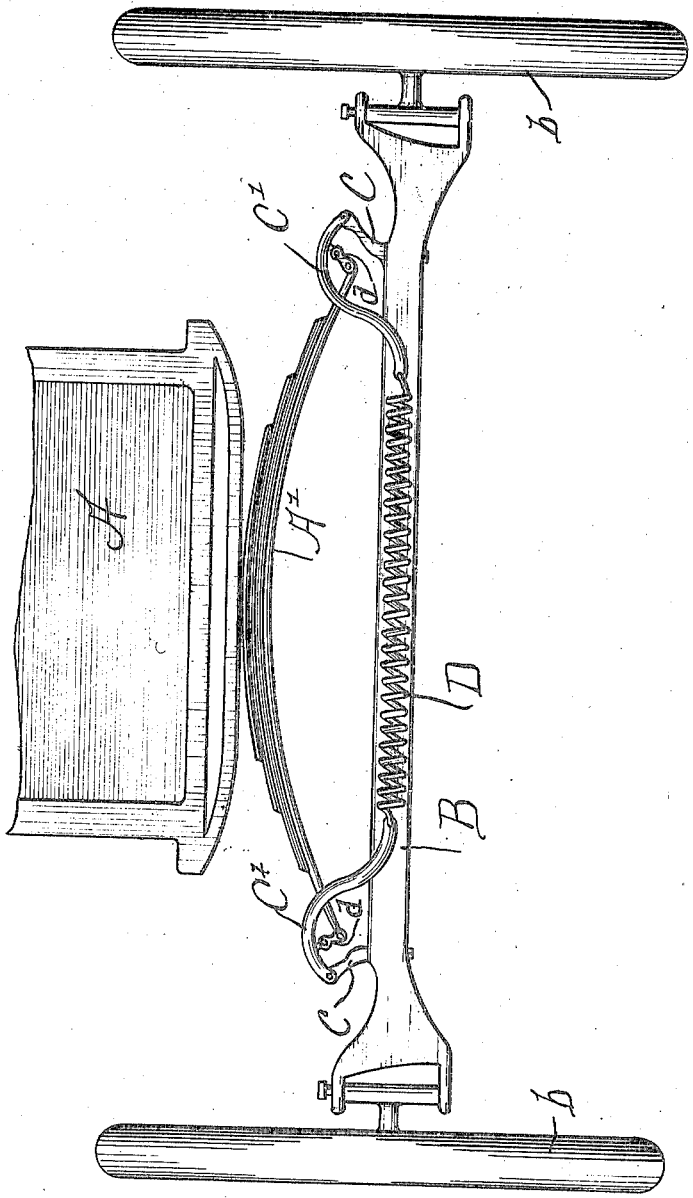

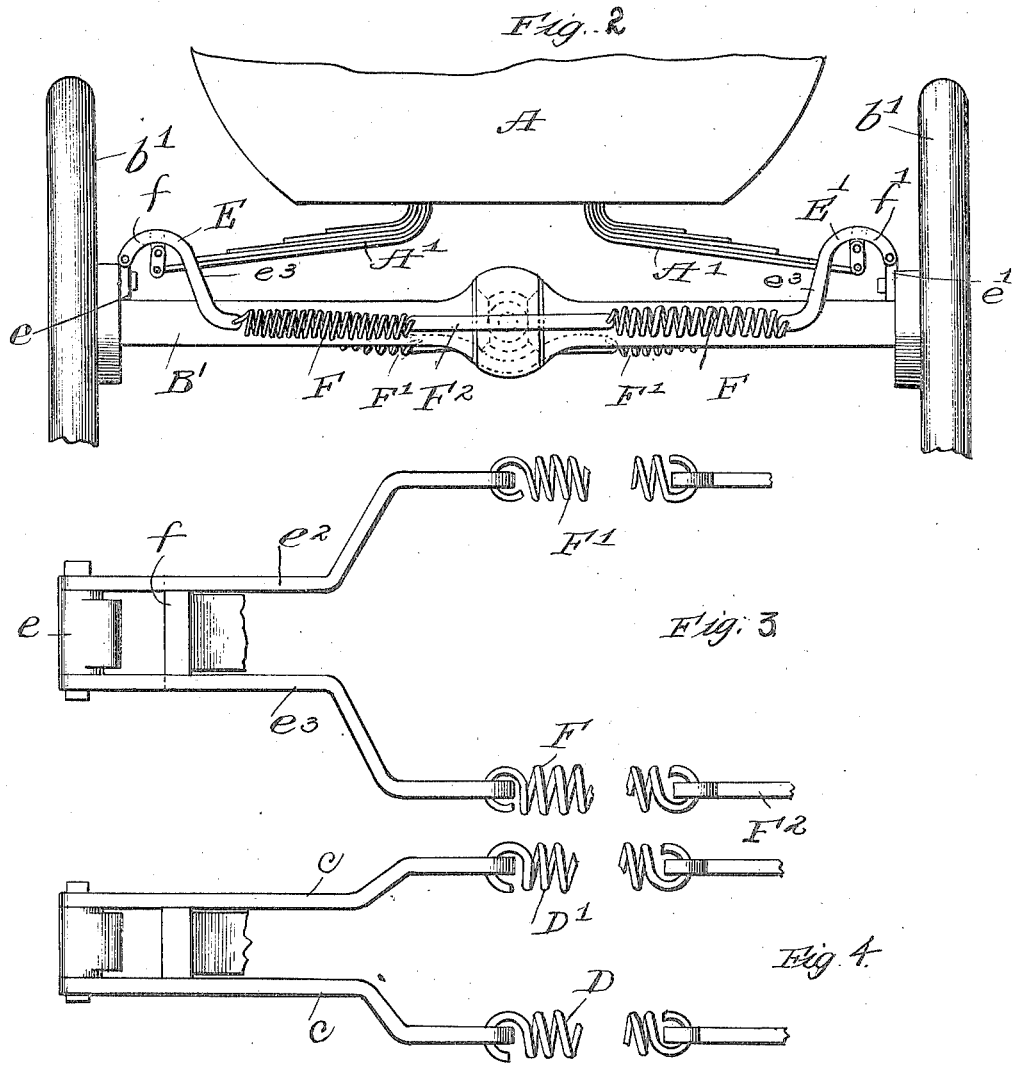

WILLIAM W. WINGER, OF WOLCOTT, INDIANA, ASSIGNOR TO RIDE E-Z SHOCK ABSORBER COMPANY, OF WOLCOTT, INDIANA, A CORPORATION OF INDIANA.

SHOCK-ABSORBER.

1,291,331.	Specification of Letters Patent.	Patented Jan. 14, 1919.

Application filed December 8, 1915. Serial No. 65,648.

*To all whom it may concern:*

Be it known that I, WILLIAM W. WINGER, a citizen of the United States, residing at Wolcott, White county, State of Indiana, have invented certain new and useful Improvements in Shock-Absorbers, of which the following, taken in connection with the drawings, is a description.

My invention has for its object the production of a shock absorber designed to be applied to vehicles, such as automobiles, and the like.

A further object of the invention is to provide such a construction, which may be applied to machines already constructed by making slight changes in the connecting parts.

A further object of the invention is to provide a shock absorber which extends transversely of the machine, and which will receive and absorb any jars or shocks to the vehicle caused by rough or uneven roadways, or for any other reason which would transmit a sudden jolt to the body of the car.

In the accompanying drawings, I have illustrated what I now consider the preferred form of my construction, in which I have shown the device applied to a machine of the Ford type, although it is obvious the device may be applicable to machines of other types.

In these drawings.

Figure 1 is a side elevation of the front axle and a portion of the car body of an automobile with my shock absorber attached;

Fig. 2 is a similar view of the rear axle; and

Figs. 3 and 4 are respectively top plan views of the rear and front attaching members;

Referring to the drawings, A represents the automobile body, supported upon the springs A', A', A', which may be of the usual form of construction.

B is the front axle and B' the rear axle, upon which are mounted the front and rear wheels, $b$ and $b'$, respectively, all of which is of well-known construction, and will not be now further described.

Secured near each end of the axle B, is an upwardly-extending projection C, to which is secured the attaching member C'.

Each of the attaching members C'—C' is formed of two side pieces $c$—$c$, (Fig. 4), which are curved, as shown in side elevation Fig. 1, and at the outer ends thereof are pivotally secured to the free ends of the projections C—C.

One end of each of these attaching members is bent outwardly to enable the ends of the attaching members to pass outside of the axle B.

D—D' are coiled springs, the ends of which are secured to the ends of the attaching members C'—C' forming the connections therebetween, one of said springs extending parallel with the axle B, upon each side thereof.

Pivotally secured at points off the centers of the curves of the attaching members C'—C', between the two sides $c$—$c$, are links $d$—$d$, to which are also pivotally secured the ends of the leaf spring A', which support the forward end of the car body.

E—E', (Fig. 2) are the attaching members which are secured to supports $e$—$e'$, attached to the rear axle B'. These attaching members are formed of two parts $e^2$—$e^3$, which are curved, as shown in Fig. 2. The ends of said attaching members are spread apart to pass the axle B', and supported upon either side thereof is a coiled spring F—F', which engages the ends of the attaching members, as shown in Figs. 2 and 3. The opposite ends of the spring upon either side of the axle B' are connected by a rod $F^2$, $f$—$f'$ are links which are pivotally secured between the sides of the attaching members E—E'.

The operation is as follows:

When the machine is traveling over a rough surface, the jolting is transmitted through the wheels to the axles, and the weight of the car body resting thereon through the spring connections, causes the vibration of the car body along vertical lines to be transmitted through the link connections to the horizontally-extending springs on both sides of the axles at the front and rear of the machine. The pressure of the car body through the leaf springs to the connecting links, drawing downwardly on the members C'—E—E', causes the force of the shock to be transmitted to the coiled springs which extend parallel with the front and rear axles of the car.

I claim:

In a vehicle shock absorber, the combination with the axle and the body spring of a vehicle, and a projection extending upwardly from each end of the axle, of a pair of bifurcated attaching members secured to each of said projections, said attaching members being curved at the upper ends thereof upon the arc of a circle and extending downwardly to straddle the axle, links connecting the attaching members to the body spring of the vehicle, each link being secured to its respective attaching member at a point off the center of the curve of said attaching member, and a spring device connecting directly the adjacent ends of the pair of attaching members, substantially as described.

In testimony whereof I have signed this specification in the presence of two subscribing witnesses.

WILLIAM W. WINGER.

Witnesses:
 JOHN E. KERCHER,
 JAMES H. DEFELL.